Patented Apr. 6, 1943

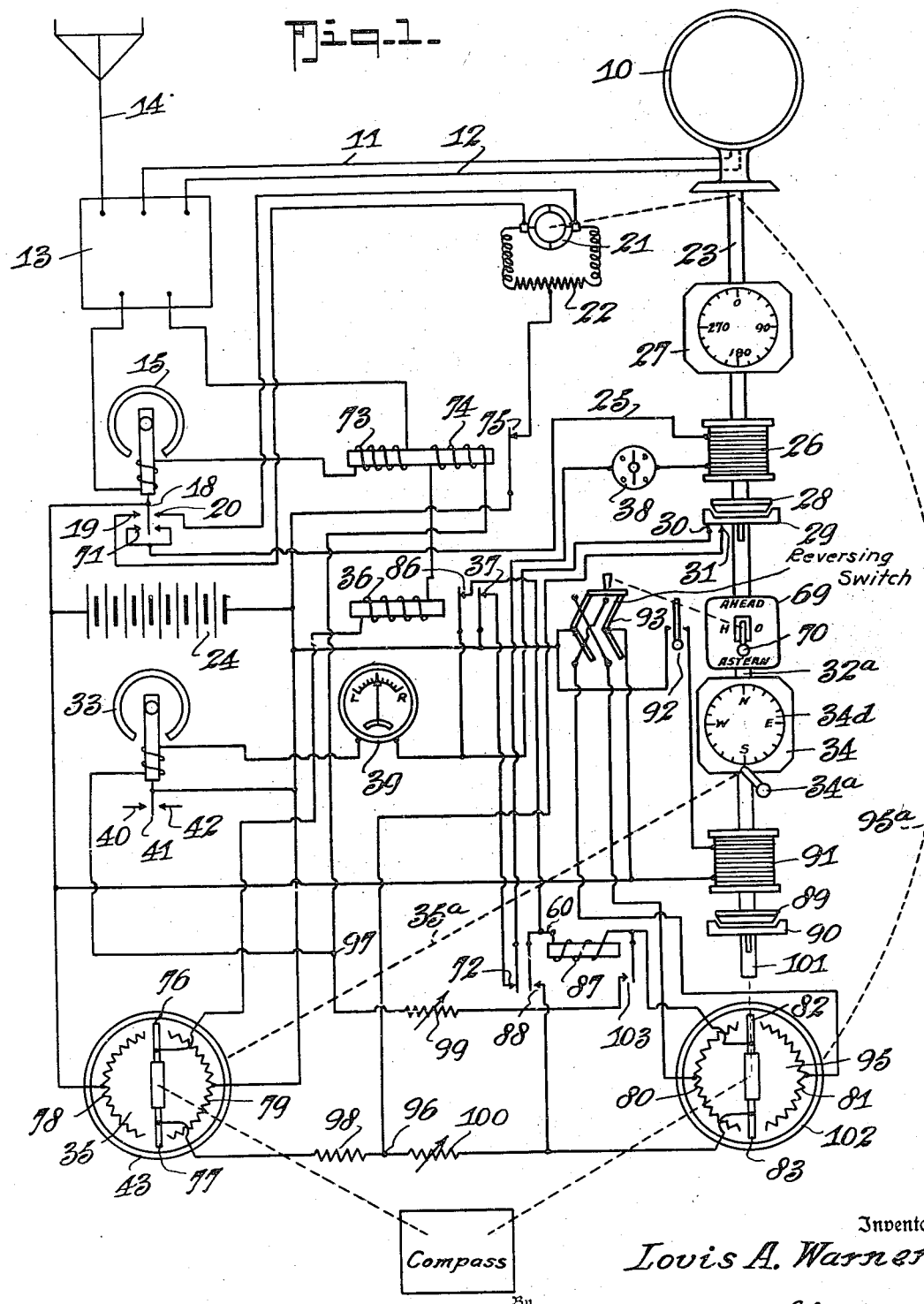

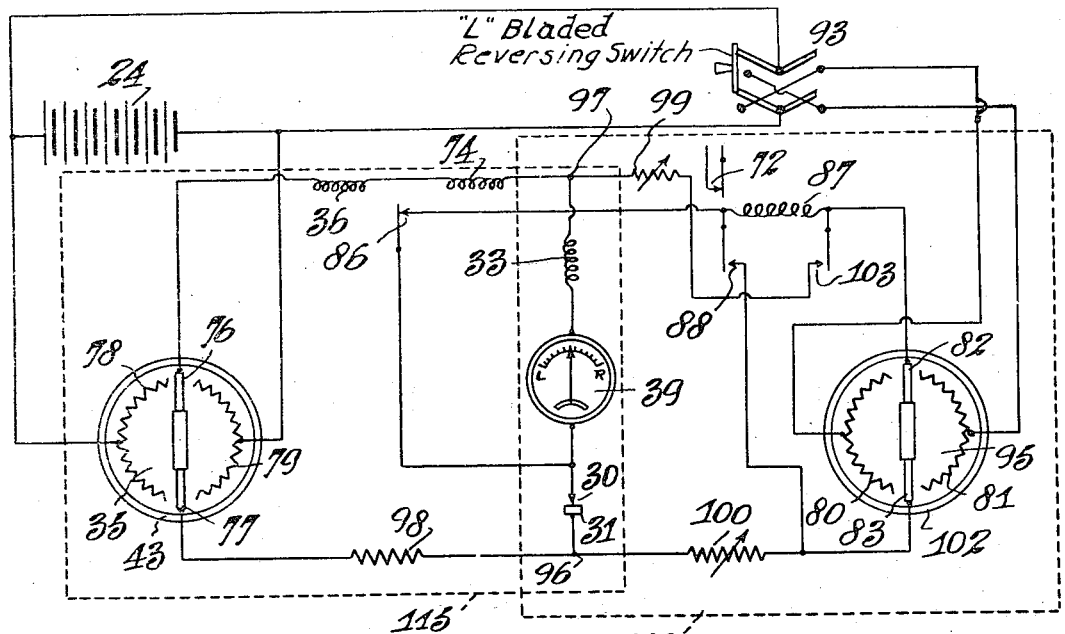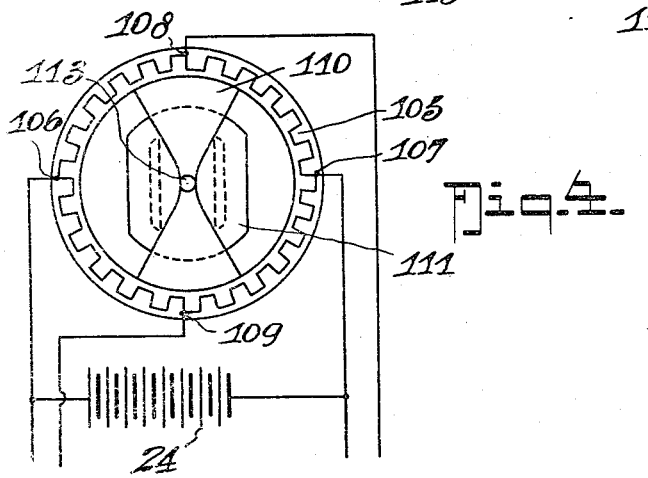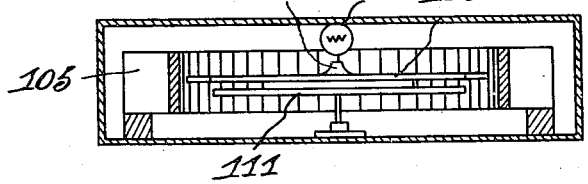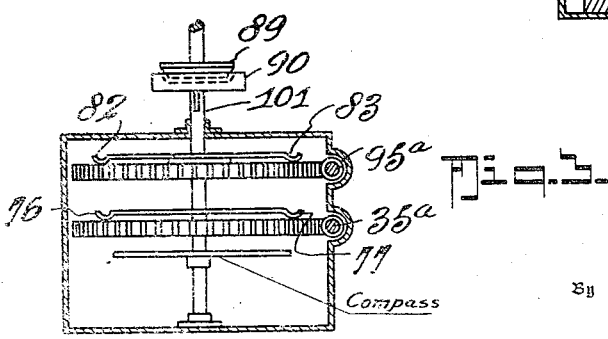

2,315,755

UNITED STATES PATENT OFFICE 2,315,755

RADIO NAVIGATOR

Louis Allen Warner, Baltimore, Md.

Application May 27, 1940, Serial No. 337,557

33 Claims. (Cl. 172—282)

This invention relates to a navigational system generally. More particularly this invention relates to a navigational system adapted to simplify and increase the reliability of radio and compass navigation.

This invention relates to a radio navigator of the same general type as that disclosed in my copending application Serial No. 279,986.

An object of this invention is to provide a radio and compass navigator in which the radio loop rotating apparatus is prevented from functioning during yaw of the craft.

Another object of this invention is to provide a radio and compass navigator in which a radial course towards or from a radio station may be maintained once the proper "crab angle" heading is selected.

A further object of this invention is to provide a radio and compass navigator in which a radial course toward or from a radio station may be maintained once the proper "crab angle" heading is selected without overcontrol or zig-zagging.

Still another object of this invention is to provide a radio and compass navigator in which electrical means is provided for distinguishing between yaw and drift for disabling the loop rotating mechanism during yaw.

Other and further objects of this invention will be apparent from the following specification and claims to those skilled in the art to which it relates.

The automatic system for radial navigation of this invention is an improvement on the system disclosed in my application No. 279,986, which includes the pre-selection of the "crab angle" heading necessary to check and prevent the wind drift, or the vector factor of the wind component, and the differentiation between the drift and yaw corrections so that each may function independently of the other. In the present system, for the purpose of yaw and drift (vector) correction, compass course navigation is resorted to, exclusively, while for ground course or radial navigation, as it may be properly called, the compass course navigational element is coordinated with, a combined or coacting radio and compass element, to effect a correction for the leeway already made, and to restore the craft along the desired radio station radial, and then to re-orient the craft to the pre-selected compass "crab angle" course. The desired ground course or track, will then be made good, at a heading that is maintained against yaw, and is such as to effectively check the wind drift (vector) component.

It should be understood that drift correction may imply two entirely different types of correction. When the word "drift" is used in the sense of a noun it denotes the leeway made, or what may be called the resultant of wind and the airplane's velocity components, when the wind vector remains uncorrected. The drift or the leeway made, is therefore the effect of the drifting or the action produced when the wind vector component coacts with the aircraft's movement. Drift correction may therefore mean the correction for the cause, namely, the drifting action, or for the effect, namely, the drift, or what may be better described as the leeway made. The correction for each is not, as commonly understood, the same. Drift correction, when implying the checking of the drifting action, is accomplished only by "crab angle" course navigation, which, in effect, changes the direction of the airplane's vector, so that the resultant of both the wind and airplane's vectors, produce flight directly towards a desired point. Drift correction, however, when implying the correction for the leeway made, is accomplished by a course change, but one certainly not a vector heading, and as a matter of fact must be one in excess of the drift-action-correcting "crab angle," if the desired radial is to be regained.

The present system first checks the cause producing the leeway, and then corrects for the leeway or the effect itself. The setting of the compass navigational element to the "crab angle" course, as provided for in the drift-action corrective feature, further acts to prevent over-control in steering towards the desired radial, and also to re-orient the airplane to the "crab angle," once the "on-radial" position is reached. In short, this system, provides for stopping the drift action, correcting for the leeway made, and then navigating and maintaining against yaw, a drift-preventing compass course.

In accordance with this invention I provide a navigation system employing a directional radio receiver and a magnetic or gyroscopic compass arranged in such a way that the mechanism for rotating the loop antenna of the directional radio receiver is disabled during conditions of yaw so that this mechanism is not affected during yaw and consequently the loop remains fixed during such conditions. This is accomplished by employing a double winding relay for controlling the energization of the loop motor, one winding of said relay being energized from the output of the radio receiver and the other winding being energized from a leg of an equalizing circuit which also includes the "off course" contactors controlled by the compass.

The aforesaid equalizing circuit consists of an "off radial" correction circuit and a circuit functioning to maintain the craft against yaw. Common to both of these circuits is a circuit including the rudder control relay, steering indicator for the pilot and the radio-loop-shaft clutch contactor. This equalizing circuit functions together with the radio receiver, the compass and the various controls to correct for drift and yaw and to enable the craft to be navigated on a radio radial.

These and other features of this invention will be apparent to those skilled in the art to which it relates from the following specification and the claims.

Referring to the drawings, briefly:

Fig. 1 is a schematic circuit diagram of the radio navigator; Fig. 2 is a simplified block diagram of the equalizing circuit employed in the radio navigator comprising this invention; Fig. 3 is a view of the compass controlled electrical elements; Fig. 4 is another view of the electrical elements associated with the compass, and Fig. 5 is a side view of the element shown in Fig. 4.

Referring to the drawings in detail, reference numeral 10 designates a loop antenna connected by wires 11 and 12 to the input of a radio signal receiver and amplifier 13. The receiver and amplifier 13 is also connected to a substantially non-directional antenna 14 and the signal energy received from both the loop 10 and antenna 14 are mixed in certain desired phase relation to produce directional signal reception. For this purpose the circuit arrangement employed in the apparatus 13 may be of the type described in Patent No. 2,144,309 issued to C. W. Hicks in which a directional antenna or loop and a non-directional antenna are connected to a radio signal receiver and amplifier for the purpose of obtaining directional reception. It is of course obvious that I may employ other circuits than the aforesaid Hicks circuit for properly phasing the signal currents and potentials derived from the loop antenna, and the non-directional antenna since various forms of these circuits are well known in the art as exemplified by my prior Patent No. 2,051,974, and I therefore do not desire to restrict myself to any one particular circuit since various circuits may have advantages depending upon the circumstances surrounding the use thereof.

The output of the radio receiver and amplifier is connected to the winding of the polarized relay 15 and to the winding 73 of the loop motor cut-off relay. The loop motor 21 is mechanically connected to the loop rotating shaft 23 for rotating the loop antenna in accordance with the energization of this motor through the operation of the relay 15. For this purpose two connections are provided to the motor 21, one from the relay contact 19 and the other from the contact 20 so that the relay 15 may determine the direction of rotation of the motor 21 depending upon which of the contacts 19 or 20 is engaged by the relay armature 18. This relay armature 18 is connected to one terminal, for example the positive terminal, of the battery 24, and the other terminal of this battery is connected through the contact 75 of the loop motor cut-off relay, to the resistance 22.

Another pair of contacts 71 is provided to the relay 15 for cooperating with the armature 18 and these contacts are connected through the wire 25 to the winding 26 of the loop antenna shaft clutch. The other terminal of the clutch winding 26 is connected through the manually operated switch 38 to one of the contacts 72 of the clutch cut-off relay 87. This relay 87 will be referred to as the off radial control relay. The other one of the contacts 72 is connected to one of the contacts 37 of the relay 36 and the other one of the contacts 37 is connected to the negative terminal of the battery 24 so it will be seen that the clutch winding 26 is connected to the battery 24 through the contacts 37, contacts 72 and switch 38 on one side and through the contacts 71 on the other side. When the clutch winding 26 is energized and pulls the clutch elements 28 and 29 together the circuit between the contacts 30 and 31 is interrupted. The contact 31 is connected to the point 96 between the variable resistors 98 and 100 and the contact 30 is connected to the off-course and steering indicator 39 and to the winding of the rudder-control-motor relay 33 which in turn is connected to the point 97 between the resistor 99 and the biasing winding 74 of the loop motor cut-off relay. The other terminal of this relay is connected to the clutch cut-off relay 36 and through this to the compass actuated contact element 76. The other compass actuated contact element 77 is connected to the other terminal of the resistance 98. These two contact elements are insulated from each other and are permanently fixed to the compass so that they are maintained in directional alignment determined by the compass and are swept across the resistance elements 78 and 79; these elements carried by the housing 43 are caused to change their position with respect to the contact elements 76 and 77 through the operation of the mechanical connection 35a between the resistance element support and the shaft 32a associated with the compass course selector 34.

The resistance elements 78 and 79 and likewise the resistance elements 80 and 81, consist of a split ring. Thus the portion 78 comprises substantially one-half of this ring and the portion 79 comprises substantially the other half. The points corresponding approximately to the centers of these halves are connected to the terminals of the battery 24. This is also true of the resistance segments 80 and 81 except in this case a reversing switch 93 is interposed between the battery 24 and the resistance segments for the purpose of reversing the polarity of the current applied to the resistance segments. This switch 93 is mechanically connected to the gear shift lever 70 of the gear set 69 which has three positions as more fully described in my co-pending application Serial No. 279,986 for Radio navigators. By mechanically coupling the switch 93 to the gear set lever 70 the polarity of the resistance segments 80 and 81 is reversed when the craft is navigated with respect to the radio station astern from that which it was when the craft was navigated with respect to a radio station ahead.

Another clutch 91 having clutch elements 89 and 90 is employed and this clutch is positioned below the compass course selector 34. This clutch 91 is connected to the contacts 92 which are closed when the gear set lever 70 is in the homing position. Thus this winding 91 is energized during homing navigation and the clutch elements 89 and 90 are in engagement during this type of navigation so that the contact elements 82 and 83 are lifted out of engagement with the associated resistance segments during homing navigation inasmuch as the insulation support of these contacts is connected to the shaft 101 as illustrated in Fig. 3.

The contact elements 82 and 83 are connected to the relay 87, the contact 82 being connected to the winding direct and to the one of the contacts 103 and the contact 83 being connected to one of the contacts 88 and through it to the other terminal of the relay winding and to one of the contacts 86 of the relay 36. The other of the contacts 86 is connected to one side of the indicator 39 and to the contact 30 of the clutch element 29. The contacts 103 and 88 are also connected to the variable resistance devices 99 and 100 respectively. When the relay 87 is energized the contacts 88 and 103 are closed while the contacts 72 are opened.

The positions of the resistance segments 78—79 and 80—81 are adjustable with respect to the contacting elements associated therewith by means of worm gear and shaft arrangements 35a and 95a respectively as shown in Fig. 3. The shaft 35a is connected to the compass course selector shaft and the shaft 95a is connected to the loop antenna shaft 23.

In order to facilitate the control of the circuits in switch 93 this double pole double throw switch is provided with a pair of angularly disposed blades so that these blades have to be shifted only through an angle of 90 degrees in order to change the polarity of the resistances 80 and 81. This is accomplished by making the blades of the switch 93 L-shaped so that when the upper blades are in contact with the terminals associated therewith the lower blades are at right angles or normal to the base of the switch, and when the lower blades are in contact with the terminals associated therewith the upper blades are at right angles to the base of the switch. These blades are mechanically connected to the lever 70 and the lower blades are in contact with their terminals when the lever 70 is in the astern position while the upper terminals are in contact with the upper blades when the lever 70 is in the ahead position.

The rudder control relay 33 is connected to control the rudder motor in a manner fully set forth in my application Serial No. 279,986.

Contactors 76 and 77 are held fixed in space by a compass or repeater device. The compass control circuit is actuated when the resistor elements 78 and 79 are rotated clockwise or counterclockwise, either during a yaw or when the course is reset by shaft 35a.

Contactors 82 and 83 are also held fixed in space by a compass or repeater device, but may be oriented in a specific direction during the initial course selection action because during this action the lever 70 of the gear set is in the H—O position so that contact 92 is closed and winding 91 is energized engaging members 89 and 90. This lifts contactors 82 and 83, in a manner similar to that shown in Fig. 3 of my prior Patent No. 2,051,974, and when the loop is rotated for an initial course selection action contactors 82 and 83 are oriented in space in a predetermined direction. When lever 70 is moved to the ahead or astern position the clutch is deenergized, member 90 drops and the contactors 82 and 83 are thereafter held fixed in the predetermined direction by the compass or repeater device.

The shell 102 of the off-radial corrector element is mechanically coupled to the loop shaft 23 so that it rotates simultaneously therewith in the same direction and amount. When the craft deviates laterally to the left or right of the desired radial, the resistances 80 and 81 are rotated clockwise or counterclockwise as the loop turns onto the "on bearing" position, thereby supplying the voltage for the "off-radial" correction circuit.

The polarity reversing switch 93 is automatically controlled when lever 70 of the gear set is placed in the ahead or astern position. The necessity for reversing the current supplied to resistances 80 and 81 will become apparent when it is considered that for the same direction of drift, shell 102 and the resistances 80 and 81, will be rotated in one direction when using a station ahead and in the opposite when using a station astern.

In Figs. 4 and 5 is illustrated a different form of control circuit to take the place of the resistance control circuits 35 and 95. This modified circuit employs a selenium light sensitive ring 105 which consists of a selenium cell made in the form of a ring or doughnut. Of course this cell may be made in four quadrants and these connected to the end thereof to form a ring. The points 106 and 107 of the selenium ring are connected to terminals of the battery 24 in the same manner as the mid points of the resistances 78 and 79 in the case of the circuit 35 and in the same manner as the resistance elements 80 and 81 in the case of the circuit 95. The points 108 and 109 of the selenium ring correspond to the contact elements 76 and 77 in the case of the circuit 35 and the contact elements 82 and 83 in the case of the circuit 95 except that of course these points 108 and 109 are not physically movable around the selenium ring as are the aforesaid contact elements with respect to the associated resistances. The same effect is produced in the selenium ring however through the use of a quartz element 110 which is rather thin and flared at its ends adjacent to the selenium ring. This quartz element is supported substantially in the center of the selenium ring over a compass element 111 so that it rotates in accordance with the movement of the compass element. The outside of the quartz member 110 is covered with a substantially opaque paint or other covering material except on the ends thereof adjacent to the selenium ring and on the top of the projection 113 adjacent to the lamp 112. Light is transmitted from the lamp 112 into the quartz member 110 through the surface 113 and out of the ends of the quartz member upon surfaces of the selenium ring. Thus the resistance of different sections of the selenium ring may be reduced in accordance with the light shining thereon with the result that the bridge circuit formed by the selenium ring is unbalanced depending upon the position of the quartz element 110 and the compass element 111 in the case of the circuit 35. In the case of the circuit 95 the quartz element 110 may be lifted from the compass element and adjusted independently of the compass element the same as the contactors 82 and 83. The arrangement shown in Figs. 4 and 5 may be more desirable where it is found that the compass element does not have sufficient power to move contactors such as 76—77 over the associated resistance elements since the arrangements shown in Figs. 4 and 5 produce no friction except in the bearings.

The operation of my invention may be readily understood from a consideration of the simplified diagram shown in Fig. 2 in which the same reference numerals are employed as in Fig. 1. The circuit arrangement shown in Fig. 2 is divided into two main branch circuits, one including the movable contactors 76 and 77 and the other including the movable contactors 82 and 83. Between these two branch circuits is connected the control circuit which includes the rudder control relay 33 and the indicator 39.

When the craft carrying the apparatus of this invention deviates from the radio station, radial signal energy received in loop 10, and non-directional antenna 14, is detected and amplified in receiver 13, and so phased as to produce directional operation of polarized relay 15. This relay energizes motor 21, in such a direction and amount as to maintain loop 10 in position normal to a radio station radial. This constitutes a conventional null-seeking loop system. During drift, occasioned by side winds, the aircraft will move laterally from the radii of one radio station to those of another. An angle will then be made between the plane's fore and aft axis, and the new radial, the balance in radio receiver output will be disturbed, and relay 15 will then operate, both to restore the loop to the null position, and to simultaneously operate the clutch 26. This clutch couples the loop rotative action to the course selector shaft 32a, through a gearing arrangement included in gear set 69, so that while the loop is being oriented to the "on bearing" position, a course change at a ratio of more than one to one, into the wind, is being set into the compass navigational element 35. When the loop reaches the "on bearing" position, relay 15 releases, de-energizing both the motor 21 and the clutch 26, whereupon the next phase of operation, namely, course orientation begins.

The change of course set into the compass directional element 35 through the shaft 35a disturbs the zero potential condition, and feeds current into the steering circuit, which being closed at contacts 30 and 31 when the clutch 26 is released, operates relay 33 and indicator 39 to turn the plane onto its newly selected course. During this course orientation action the loop swings back to retain its alignment, normal to the radial, while the clutch circuit is opened by the operation of the relay 36 (by energization from the steering circuit), so that the loop rotative action at this time does not effect any course change. When the plane reaches the "on course" position, compass element 35 restores to zero potential and associated control devices also restore to normal. The system is now ready for the "off radial" correction, or the correction for the leeway made.

The component parts of the "off radial" corrector, are briefly, as follows: the coacting radio and compass element 95, the control relay 87, the orienting clutch and shaft 91 and 101 respectively, the clutch switch 92, the reversing switch 93, and the control resistors 99 and 100. The element 95 comprises the contactors 82 and 83 which may be set in a desired direction by the orienting means and then maintained in that direction by a magnetic or gyroscopic compass. In order to navigate a craft along a radial to or from a radio transmitting station these contactors are set with respect to the desired radial. Cooperating with these contactors, are the resistors 80 and 81 which are carried by the shell 102 and rotated simultaneously with and by the loop shaft 23 and coupling 95a. Voltage is produced at 82 and 83 when the craft is off the set radial, and zero voltage prevails when on the desired radial. When lateral deviation has set in as a result of an uncorrected drift action, the coacting radio and compass element 95 will feed voltage into the steering circuit, after the "crab angle" selection and orientation actions have been completed, to steer the craft past the "crab angle" heading so as to regain the desired radial. Here it should be pointed out that the contact 86 of relay 36 is closed when this relay is energized, so that when the contactors 82 and 83 are actuated and apply a potential on the winding of relay 87, this relay closes contacts 88 and 103 and opens contact 72. This relay 87 thereby applies the potential from the contactors 82—83 to points 96—97. As soon as the craft turns, the contactors 76—77 of element 35 set on the "crab angle," feed opposing voltage across the steering circuit (as shown in Fig. 2) and so prevents steering overcontrol. When the radial is reached, voltage from the contactors 82 and 83 drops to zero, thereby permitting the element 35 to dominate the steering circuit and re-orient the craft back onto the preselected "crab angle" course. At this point, the system becomes ready for a repetition of the cycle of drift cause and effect corrections, if drift continues, by selecting greater increments of courses into the wind, if necessary, and by restoring the craft to the desired line of flight.

The explanation of the operation of this invention is simplified when it is considered that the portion of the circuit shown in Fig. 2 embraced by the dotted lines 115 functions to maintain the craft against yaw whereas the portion of the circuit embraced by the dotted lines 116 accomplishes the off radial correction. For the purposes of this invention the word radial is taken to mean radiant energy radiating from a radio transmitting station in a manner simulating the spokes of a wheel, that is, corresponding to the radii of a circle the center of which corresponds to the radio transmitting station.

The contactors 76 and 77 which are also compass controlled also function to apply a voltage between the points 96 and 97 and the purpose of this voltage application is to maintain the craft against yaw. For this purpose this latter voltage is applied through the biasing windings 74 of the loop motor cut off relay and through the winding 36 of the clutch cut off and off radial cut off relay.

The variable resistances 99 and 100 control the voltage output from the contactors 82 and 83 and therefore the lower the values of these resistances the higher will be the voltage applied to the points 96 and 97 and the further the contactors 76 and 77 would have to be moved over their associated resistances before the voltage applied to 96 and 97 from contactors 82 and 83 will be equalized by voltage applied to these points through the contactors 76 and 77. On the other hand the larger the values of the resistances 99 and 100 the less the contactors 76 and 77 will have to be moved to equalize this potential. In this way the amount of over control required to bring the craft back to the radial is determined.

It will be observed that the automatic radio compass has three functions in this invention, namely, 1, radio controlled course selection, 2, operates as a component of the combined radio and compass radial deviation correction devices and 3, operates as an automatic bearing indicating device for position finding. The course navigating element 35 enters into four distinct functions, namely, 1, operates in the radio controlled course change mechanism, 2, operates in compass control course orientation, 3, operates in yaw correction and 4, operates in set course re-orientation after off radial correction. The steering control devices 33 and 39 function in, 1, compass controlled course orientation, 2, yaw correction, 3, off radial correction and 4, crab angle course re-orientation after off radial correction.

These functions may be more completely appreciated when considered from the standpoint of the separate corrections involved as follows:

*Drift correction*

During radio-controlled course selection, clutch magnet 26 opens contacts 30—31 and this prevents operation of steering control devices 33 and 39, by either the elements 35 or 102. Motor control relay 73—74 does not operate and contact 75 remains closed, permitting the functioning of the automatic radio compass to select drift-correcting-and-preventing courses.

During compass-controlled course orientation, clutch magnet 26 is released and contacts 30—31 are closed consequently steering control devices 33—39 are actuated and course change is effected. Relay 36 operates, opening contact 37 and preventing operation of clutch 26. Contact 86 is also opened and off-radial action is prevented at the same time relay 73—74 does not operate and contact 75 remains closed, permitting back swing of the automatic radio compass.

*Yaw correction*

During compass-controlled course navigation, relay 36 operates, opening contact 37 and this prevents operation of clutch 26. Contact 86 is also opened, preventing off-radial action. At the same time relay 73—74 operates, opening contact 75 and preventing loop rotation. For this purpose relay 36 is a fast operating relay, so that the yaw correction function is given priority to the drift and radial deviation correction actions.

*Off-radial correction*

Co-acting radio and compass controlled radial deviation correction is accomplished as follows:

1. Manually setting of 82—83 along a desired radial. The switch 38 is open. Lever 70 is in the H—O position with contact 92 closed, energizing clutch winding 91. The handle 34a is actuated to orient 82—83 along the desired radial.

2. Automatic setting of 82—83 along the desired radial. The switch 38 is closed. Lever 70 is in the H—O position with contact 92 closed, energizing clutch 91. Shaft 101, coupled to shafts 32a and 23, is rotated by the radio compass during initial course orientation and orients 82—83 along the desired radial.

Movement of lever 70 to the "Ahead" or the "Astern" positions, automatically sets polarity of the current to 80 and 81 for each position in the proper direction through the use of the polarity reversing switch 93.

Relay 87 is a comparatively slow-operating relay and delays the off-radial correction actions until after yaw and drift are taken care of. This relay can operate only when the clutch comprising elements 28 and 29 is released and relay 36 is in a non-operative condition. When the relay 87 operates contact 88 is closed and locks operation of relay 87, at the same time contact 72 is opened and prevents operation of clutch 26. Contact 103 is closed and completes circuit to 82—83.

Advantage is taken of the over-control prevention feature when the craft turns past the course set into the element 35. This element applies a potential to 96 and 97, opposing that from element 102 neutralizing the latter. Regulation of the over-control prevention is accomplished by adjusting the adjustable resistors 99 and 100 which determine the angle of turn from the set course, at which the over-control prevention voltage from element 35 neutralizes the voltage from element 102.

During the off-radial period voltage from element 35 is neutralized by voltage from element 102 and consequently the function of the course navigating element 35 is eliminated.

One of the advantages of this system is in the connection of the automatic radio compass to the winding 73 and the connection of the automatic steering compass 35 to the winding 74 of this same relay controlling the contact 75 which is connected to interrupt the loop motor energizing circuit during yaw.

During yaw, the radio and compass sensitivities are unbalanced in the same direction, and windings 73 and 74 being additively energized, sufficient torque is produced on the armature associated with contact 75 to open the motor circuit and prevent loop rotation during this period. During course selection incident to the drift correcting action, with the plane "on course" winding 74 is de-energized, so that, while winding 73 is energized from radio output, its energization is insufficient to actuate the armature associated with contact 75. During course orientation action subsequent to course selection the radio and compass sensitivities are unbalanced in the opposite direction, and windings 73 and 74 being differentially energized, no torque is produced on the armature associated with contact 75 so that motor circuit remains closed during this period.

Another feature of this invention is that switch 60 may be manually opened to prevent any off radial correction when navigating the craft toward a station ahead after a certain amount of drift has taken place. The craft will then navigate along the newly selected radial from the drifted position to the radio station without necessarily flying a longer path that may be required to reach the first selected radial.

I have described the various features of my invention in detail, however, I do not desire to limit this invention to the exact details set forth in the foregoing specification except insofar as such details may be defined in the claims.

What I claim is:

1. In combination, compass control means for navigating, and maintaining selected steering courses against yawing effects, radio responsive means for indicating and correcting a drift action, including means for selecting the proper "Crab Angle" course, electrical means connected to said compass and said radio responsive means for correcting deviation from a predetermined radio station radial, by navigating a course in excess of the said "Crab Angle" course, said last means including means for maintaining the said course, in excess of the "crab angle" course, against yawing effects, and simultaneously preventing the first said means from orienting the craft onto the selected "crab angle" course, until the amount of the drift has been reduced to zero.

2. A compass and radio controlled navigational system for a mobile craft, comprising: a compass, means controlled by said compass for navigating the craft and maintaining set steering courses, radio receiving means including rotatable antenna means and means for selecting "crab angle" courses during drift of the craft, said last means including electromagnetic clutching means for engaging said rotatable antenna means to said course selecting means, and means controlled by both said compass and said radio receiving means for substantially correcting deviation from a preselected radio station radial, said last means including means for preventing the operation of said electromagnetic clutching means during the "off radial" correction period.

3. A navigational system, comprising: means for navigating a craft along selected steering courses, means for selecting drift-correcting courses, means for navigating substantially along a predetermined radio station radial coincident with an intended ground course, said last means including means for steering the craft towards the said radial, means for preventing steering over-control, and adjustable means for controlling the said over-control preventing means.

4. A navigational system, comprising: means for navigating and maintaining selected steering courses, means for selecting drift-correction-angle courses, means for navigating along a predetermined radio station radial, said last means including means for correcting deviation from said radial, by steering a course in excess of the drift correcting course electrical cut out means for preventing the first said means from functioning during the "off radial" correction period, and adjustable means for controlling said course maintaining cut-out means.

5. In combination, compass control means for navigating and maintaining selected steering courses against yawing effects, combined compass and radio responsive means for correcting deviation from a predetermined radio station radial, and electrical cut out means responsive to said first means for preventing "off radial" correction during yaw.

6. In combination, means for navigating selected steering courses, radio responsive means for selecting "crab angle" courses, combined compass and radio responsive means for correcting deviation from a predetermined radio station radial, and means responsive to said second means for preventing "off radial" correction during the selection of the said "crab angle" courses.

7. The combination in a system for drift-correcting navigation along a preselected ground course, of compass means for navigating and maintaining set courses, radio responsive means for effecting course changes, said last means including means for selecting initial courses towards a desired point, automatically corrected for variation and deviation, combined compass and radio responsive means for correcting lateral deviation from a predetermined ground course, including automatic electrical means for setting the compass control element of said combined compass and radio means, simultaneously with and by the initial course orientation by radio, and radio rotatively controlled means for co-acting with said compass control element to maintain navigation along the predetermined radial of radio signal energy.

8. The combination in a system for drift-correcting navigation along a preselected course with respect to the ground, of compass means for navigating and maintaining selected courses, radio responsive means for effecting course changes, including means for initial course orientation towards a predetermined point, combined compass and radio means for correcting lateral deviation from a predetermined ground course, including automatic means for aligning the compass control element of said combined compass and radio means, simultaneously with and by the initial course orientation by radio, electromagnetic clutching means for engaging the radio course changing means to the compass element setting means, during the said course orientation action, and radio rotatively controlled means for cooperating with said compass control element to maintain navigation along the selected radial of radiant energy.

9. The combination in a system for drift-correcting navigation along a preselected ground course, of compass means for navigating and maintaining selected courses, radio means for selecting drift correcting courses, including means for manually controlling the reversal of course change rotation by radio, when using station behind the craft for navigational reference, combined compass and radio means for correcting lateral deviation from a predetermined ground course, said last means including means for reversing the polarity of current to the radio control element of said combined compass and radio means, when navigating away from a radio station, so that for like deviations from the desired radial, like potential will be supplied the steering control means, regardless whether a station ahead or astern of the craft is used for navigational reference, and means for adjusting the position of said polarity reversing means simultaneously with and by the manually controlled means for selecting drift-correcting courses, using stations ahead or astern of the craft.

10. A navigational system, comprising: compass control means for course orientation and yaw correction, radio control means for drift correction, said last means including a station-seeking antenna system, electrical control means responsive to said first means and means responsive to said second means to prevent yaw of the craft from effecting rotation of said antenna with respect to the craft.

11. A navigational system, comprising: compass control means for course navigation, radio control means for drift correction, including means for orientation onto the drift-correcting course, a rotatable antenna for said radio control means, a motor for rotating said antenna, electrical control means for preventing the rotation of the station-seeking antenna during yaw, and means for preventing said antenna motor cut-off during the course orientation period.

12. A navigational system, comprising: compass control means for course navigation, radio control means for drift correction, a rotatable antenna for said radio control means, means for preventing antenna rotation during yaw, and means for preventing antenna rotation cut-off during drift-correction.

13. The combination in a system for drift correcting navigation, of drift sensitive means for selecting the drift-correcting crab angle course, means for applying an over-correction to the said crab angle course to restore the craft being navigated to its original intended ground-course after drift away from the said ground-course has set in, and adjustable means for controlling the amount of over-correction and the rate at which the said craft moves laterally towards the said groundcourse.

14. The combination in a system for drift correcting navigation, of radio directional control means for selecting the proper drift-correcting crab angle course, cooperative compass control and radio directional control means for steering a course in excess of the said crab angle course after drift has set in to restore the craft being navigated to the intended groundcourse, and manually adjustable electrical control means for adjusting the amount of excess course change applied to the said drift-correcting crab angle course to control the rate at which the drift angle is reduced to zero.

15. The combination in a system for drift correcting navigation, of drift correcting means, including means for selecting the crab angle course, and means for restoring the craft being navigated to a predetermined groundcourse, after drift has set in, by steering a course having an angle in excess of the crab angle heading, until the said groundcourse is reached, and cut out means for preventing the execution of changes to restore the craft to the predetermined ground course until after the crab angle course has been selected.

16. The combination in a system for automatic drift corrected navigation, of drift sensitive means for selecting the crab angle course, means for steering a course having an angle in excess of the said crab angle course, to restore the craft being navigated, to the intended ground course after drift has set in, and control means responsive to the drift sensitive means for preventing execution of changes to restore the craft to the predetermined groundcourse during the period that the crab angle course is being selected.

17. The combination in a system for drift corrected navigation, of radio directional control means for selecting the crab angle course, magnetic or gyroscopic compass control means cooperating with the said radio directional control means for steering and navigating a course in excess of the selected crab angle course, after drift has set in, in order to restore the craft being navigated, to the intended groundcourse, electrical means responsive to the first means for preventing the execution of course changes to restore the craft to the predetermined ground course during the period that the crab angle course is being selected.

18. A radio navigational system adapted to follow a radial course to a radio station once the proper "crab angle" heading is selected, without over control or zig-zagging, comprising: a compass, a pair of equalizing circuits, steering control means common to said circuits, a course selector, means for adjusting one of said equalizing circuits in accordance with said compass and said course selector to maintain a course against yaw, a radio compass, and means for adjusting the other of said equalizing circuits in accordance with said first mentioned compass and said radio compass to follow a predetermined radial course.

19. In a system for drift correcting navigation the combination of: an equalizing circuit having a pair of variable resistances, a compass mechanically connected to vary the effective resistances of said variable resistances, means for disengaging the mechanical connection between one of said variable resistances and said compass and for manually adjusting this variable resistance, said last mentioned means including a course setting manual control having means for adjusting the other of said variable resistances, a steering indicator for the craft, and connections for connecting said steering indicator between the connections of said equalizing circuit connecting said resistances.

20. In a system for drift correcting navigation the combination of: an equalizing circuit having a pair of variable resistances, a compass mechanically connected to vary the effective resistances of said variable resistances, means for disengaging the mechanical connection between one of said variable resistances and said compass and for adjusting this variable resistance, said last mentioned means including a course setting control, a steering indicator for the craft, and connections for connecting said steering indicator between the connections of said equalizing circuit connecting said resistances.

21. In a system for drift correcting navigation the combination of: an equalizing circuit having a pair of variable resistances, a compass mechanically connected to vary the effective resistances of said variable resistances, means for disengaging the mechanical connection between one of said variable resistances and said compass and for adjusting this variable resistance, said last mentioned means including a course setting control, steering means for the craft, and connections for connecting said steering means between the connections of said equalizing circuit connecting said resistances.

22. The combination of a directional radio receiver, an antenna for said radio receiver, a rotatable shaft for said antenna, a circuit adapted to be balanced including a pair of variable resistance devices, a compass for controling said variable resistance devices, a mechanical connection between one of said variable resistance devices and said rotatable shaft, a course selector coupled to said rotatable shaft, a mechanical connection between said course selector and said last mentioned variable resistance device, and means responsive to the balancing and unbalancing of said first mentioned circuit for indicating deviation from the selected course.

23. A directional radio receiver, an antenna for said radio receiver, a rotatable shaft for said antenna, a circuit adapted to be balanced including a pair of variable resistance devices, a compass for controlling said variable resistance devices, a mechanical connection between one of said variable resistance devices and said rotatable shaft, a course selector coupled to said rotatable shaft, a clutch between one of said resistance devices and said course selector for adjusting said resistance device independently of said compass, and means responsive to the balancing and unbalancing of said first mentioned circuit for indicating deviation from the selected course.

24. A directional radio receiver, an antenna for said radio receiver, a rotatable shaft for said antenna, a circuit adapted to be balanced including a pair of variable resistance devices, a compass for controlling said variable resistance devices, a mechanical connection between one of said variable resistance devices and said rotatable shaft, a course selector coupled to said rotatable shaft, a mechanical connection between said course selector and said last mentioned variable resistance device, manually adjustable means connected into said first mentioned circuit to control the response thereof, and means responsive to the balancing and unbalancing of said first mentioned circuit for indicating deviation from the selected course.

25. A navigation system for navigating along a predetermined radial track of a radio station, comprising: a compass, a radio compass, a variable resistance balanced circuit adapted to be varied by both said compass and said radio compass, a source of current supply connected to said variable resistance circuit, a relay connected to said balanced circuit, a course setting device, means for manually adjusting said circuit in accordance with said course setting device during homing navigation, and means responsive to the balancing and unbalancing of said balanced circuit for indicating deviation from the selected course.

26. A navigation system for navigating along a predetermined radial track of a radio station, comprising: a compass, a radio compass, a variable resistance balanced circuit adapted to be varied by both said compass and said radio compass, a source of current supply connected to said variable resistance circuit, a relay connected to said balanced circuit, a course setting device, automatic means for adjusting said circuit in accordance with said course setting device during initial course orientation and during homing navigation, and means responsive to the balancing and unbalancing of said balanced circuit for indicating deviation from the selected course.

27. A navigation system for navigating along a predetermined radial track of a radio station, comprising: a compass, a radio compass, a variable resistance balanced circuit adapted to be varied by both said compass and said radio compass, a source of current supply connected to said variable resistance circuit, a relay connected to said balanced circuit, a course setting device, means for adjusting said circuit in accordance with said course setting device during homing navigation, and means responsive to the balancing and unbalancing of said balanced circuit for indicating deviation from the selected course.

28. A navigation system for navigating a craft to or away from a radio station, comprising: a directional radio receiver having a rotatable antenna, electrically energized means for rotating said antenna in accordance with the energization of said radio receiver and means for preventing the rotation of said antenna by said electrically energized means during yaw of the craft.

29. A navigation system for navigating a craft to or away from a radio station, comprising: a directional radio receiver having a rotatable antenna, a compass controlled circuit, electrically energized means for rotating said antenna, and relay means having a winding connected to said directional radio receiver and another winding connected to said compass controlled circuit for preventing the rotation of said antenna by said electrically energized means during yaw of the craft.

30. A navigation system for navigating a craft to or away from a radio station, comprising: a directional radio receiver having a rotatable antenna, a compass controlled circuit including variable resistance means, electrically energized means for rotating said antenna, and electromagnetic circuit control means having a winding connected to said radio receiver and another winding connected to said variable resistance means, said windings being additively energized for preventing the rotation of said antenna by said electrically energized means during yaw of the craft.

31. A navigation system for navigating a craft to or away from a radio station, comprising: a directional radio receiver having a rotatable antenna, a compass controlled circuit electrically energized means for rotating said antenna, and electromagnetic means having a winding connected to said directional radio receiver and another winding connected to said compass controlled circuit, said windings being connected to be additively energized during yaw to prevent rotation of said antenna by said electrically energized means and to be differentially energized during course selection and orientation to insure antenna rotation by said electrically energized means.

32. A navigation system for navigating a craft, comprising: a directional radio receiver having a rotatable antenna, electrically energized means for rotating said antenna, a source of current supply, relay means connected to said radio receiver for connecting said source of current supply to said electrically energized means, and compass controlled means for controlling the operation of said relay means to prevent said antenna from being rotated during yaw.

33. A navigation system for navigating a craft, comprising: a directional radio receiver having a rotatable antenna, electrically energized means for rotating said antenna, a source of current supply, relay means connected to said radio receiver for connecting said source of current supply to said electrically energized means, and compass controlled means for controlling the energization of said relay means to prevent said antenna from being rotated during yaw and for insuring the rotation of said antenna during course selection and orientation.

LOUIS ALLEN WARNER.